(12) United States Patent
Yoo (10) Patent No.: US 9,995,581 B2
(45) Date of Patent: Jun. 12, 2018

(54) ACHIEVING ULTRA-HIGH RESOLUTION HETERODYNE SYNTHETIC IMAGING ACROSS MULTIPLE PLATFORMS USING OPTICAL FREQUENCY COMB SOURCES

(71) Applicant: The Regents of the University of California, Oakland, CA (US)

(72) Inventor: Sung-Joo Ben Yoo, Davis, CA (US)

(73) Assignee: The Regents of the University of California, Oakland, CA (US)

(*) Notice: Subject to any disclaimer, the term of this patent is extended or adjusted under 35 U.S.C. 154(b) by 0 days. days.

(21) Appl. No.: 15/377,754

(22) Filed: Dec. 13, 2016

(65) Prior Publication Data

US 2017/0170909 A1 Jun. 15, 2017

Related U.S. Application Data

(60) Provisional application No. 62/266,796, filed on Dec. 14, 2015.

(51) Int. Cl.
*G01C 11/00* (2006.01)

(52) U.S. Cl.
CPC .................... *G01C 11/00* (2013.01)

(58) Field of Classification Search
None
See application file for complete search history.

(56) References Cited

U.S. PATENT DOCUMENTS

| 4,950,880 A * | 8/1990 | Hayner | G01S 7/497 250/201.9 |
| 5,093,563 A * | 3/1992 | Small | G02B 27/58 250/201.9 |
| 8,761,603 B1 * | 6/2014 | Maleki | G01S 7/003 398/129 |
| 2006/0210279 A1 * | 9/2006 | Hillis | B82Y 20/00 398/118 |

(Continued)

OTHER PUBLICATIONS

Okubo et al. "Novel phase-locking schemes for the carrier envelope offset frequency of an optical frequency comb", Oct. 15, 2015, Applied Physics Express 8, 112402 (2015) The Japan Society of Applied Physics.

*Primary Examiner* — Nathan Cors
(74) *Attorney, Agent, or Firm* — Park, Vaughan, Fleming & Dowler LLP (57) ABSTRACT

A system that performs heterodyne optical imaging across multiple platforms gathers an optical signal from an optical sensor at each of the multiple platforms. At the same time, an optical frequency comb local oscillator (LO) at each of the platforms generates a reference comb signal comprising a set of optical frequency comb lines at different frequencies, wherein each optical frequency comb LO is locked to a local atomic clock at each of the platforms. Next, a mixer, at each of the platforms, is used to mix the optical signal gathered from the optical sensor with the reference comb signal generated by the optical frequency comb LO to generate a mixed signal. The system then communicates the mixed (Continued)

signals generated at each of the platforms to a central location. Finally, the system correlates the mixed signals received from each of the platforms and generates a reconstructed optical image.

25 Claims, 6 Drawing Sheets
(3 of 6 Drawing Sheet(s) Filed in Color)

(56) References Cited

U.S. PATENT DOCUMENTS

| | | | | |
|---|---|---|---|---|
| 2008/0100510 | A1* | 5/2008 | Bonthron | G01S 7/024 342/373 |
| 2009/0269083 | A1* | 10/2009 | Cho | B82Y 20/00 398/212 |
| 2014/0133322 | A1* | 5/2014 | Steer | H01Q 3/26 370/252 |

* cited by examiner

ACHIEVING ULTRA-HIGH RESOLUTION HETERODYNE SYNTHETIC IMAGING ACROSS MULTIPLE PLATFORMS USING OPTICAL FREQUENCY COMB SOURCES

CROSS-REFERENCE TO RELATED APPLICATION

This application claims priority under 35 U.S.C. § 119(e) to U.S. Provisional Application Ser. No. 62/226,796, entitled "Achieving Ultra-High Resolution Heterodyne Synthetic Imaging on Multiple Platforms Using Optical Frequency Combs," by inventor Sung-Joo Ben Yoo, filed on 14 Dec. 2015, the contents of which are incorporated by reference herein.

GOVERNMENT LICENSE RIGHTS

This invention was made with U.S. government support under grant numbers W31P4Q-13-1-0006 and W31P4Q-15-C-0003 awarded by the Defense Advanced Research Projects Agency (DARPA). The U.S. government has certain rights in the invention.

FIELD

The disclosed embodiments generally relate to heterodyne optical imaging systems. More specifically, the disclosed embodiments relate to a new technique for achieving ultra-high resolution heterodyne synthetic imaging across multiple platforms using optical frequency comb sources.

RELATED ART

Satellite-based imaging systems are typically used to capture images of objects located a significant distance away, so high resolution is important for resolving details of the objects that are being imaged. Such high resolution is typically achieved by using a large lens to capture the image. However, a large lens is relatively expensive and heavy, and requires a large rocket to transport it into orbit. As an alternative to using large lenses, researchers have been developing synthetic-aperture imaging systems to capture high-resolution images. Instead of using a single large aperture, synthetic-aperture imaging systems use many small spatially distributed apertures to gather multiple images, which are subsequently combined into a single high-resolution image that has equivalent resolution to an image gathered through a large aperture.

Attempts to develop synthetic-aperture techniques for space-based optical imaging systems have so far been unsuccessful due to the significant risks and costs associated with the complex active optics required to coherently combine the optical signals from the collector optics, which, for example, can comprise a multiple telescope array or a segmented primary telescope. Note that such an optical combiner requires nanometer precision metrology and active optics to compensate for wavefront piston and tilt errors, and induced field-dependent wavefront errors.

Fortunately, it is possible to use a heterodyne imaging system in place of the optical combiner. A heterodyne imaging system generally operates by mixing a collected signal with a high-frequency reference signal from a local oscillator (LO) to generate a heterodyne signal that has a lower beat frequency. By performing heterodyne imaging across multiple platforms, it is possible to generate a high-resolution image; however, this requires absolute calibration and stability of the optical sources. Hence, such systems typically utilize a single laser as a local oscillator (LO) that distributes signals to multiple platforms. Unfortunately, for mobile platforms, such as satellites, this creates a significant challenge in distributing the LO signal to the mobile platform with acceptable stability, either through optical fiber or by other means. Another challenge is to achieve sufficient information collection to produce an acceptable image, because the detector bandwidths will be far less than the optical bandwidths (GHz versus THz).

Hence, what is needed is a satellite-based heterodyne imaging system that does not suffer from the above-described drawbacks of existing systems.

SUMMARY

The disclosed embodiments provide a system that performs heterodyne optical imaging across multiple platforms. During operation, the system gathers an optical signal from an optical sensor located at each of the multiple platforms, wherein each of the optical sensors is directed to gather an image of the same imaging-target. The system also uses an optical frequency comb local oscillator (LO) located at each of the multiple platforms to generate a reference comb signal comprising a set of optical frequency comb lines at different frequencies, wherein each optical frequency comb LO is locked to a local atomic clock at each of the multiple platforms. Next, the system uses a mixer, located at each of the multiple platforms, to mix the optical signal gathered from the optical sensor with the reference comb signal generated by the optical frequency comb LO to generate a mixed signal. The system then communicates the mixed signals generated at each of the multiple platforms to a central location. Next, the system correlates the mixed signals received from each of the multiple platforms at the central location. Finally, the system uses the correlated signals to generate a reconstructed optical image having a spatial resolution exceeding a spatial resolution that can be obtained from a single optical sensor.

In some embodiments, the optical frequency comb LOs located at each of the multiple platforms are synchronized with each other, so that the optical frequency comb LOs are effectively synchronous.

In some embodiments, during operation, each optical frequency comb LO is self-referenced by using a frequency multiplier to rate-multiply a comb line generated by the optical frequency comb LO, and then locking the rate-multiplied comb line to a corresponding higher optical frequency comb line generated by the optical frequency comb LO.

In some embodiments, the mixed signal generated at each of the multiple platforms captures a spectrum around each of the optical frequency comb lines in the reference comb signal.

In some embodiments, generating the reconstructed optical image involves combining the captured spectrum around each of the optical frequency comb lines to produce a bright and rich color image.

In some embodiments, the inherently polarization sensitive heterodyne process is exploited to reconstruct optical images of the desired polarization only, therefore, achieving polarization sensitive imaging or analysis of the polarization dependence of the images.

In some embodiments, two polarization LOs are utilized in two parallel streams of the optical signals to achieve dual polarization reconstruction of images.

In some embodiments, a synthetic-aperture imaging technique is used to generate the reconstructed optical image.

In some embodiments, a number of components at each of the multiple platforms, including the optical frequency comb LO and the mixer, are implemented using planar optical circuits.

In some embodiments, each of the optical sensors comprises a collector telescope In some embodiments, each of the multiple platforms comprises a satellite.

In some embodiments, the multiple platforms are synchronized with each other by atomic clocks with precise information about relative locations of the multiple platforms.

In some embodiments, the central location comprises a ground station that communicates with the multiple platforms.

In some embodiments, communicating the mixed signals to the central location involves digitizing the mixed signals prior to the communication.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices, such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

General Approach

The present invention provides a new technique for performing heterodyne optical imaging across multiple platforms (e.g., multiple satellites) by placing a self-referenced, precise and low-noise optical frequency comb source at each platform. In this way, multiple platforms spanning a larger spatial extent than a single platform (e.g., more than 1,000 times larger) can be used to create an image having a spatial resolution that greatly exceeds the resolution of an image created using the platform by itself (as much as 1,000 times greater).

As mentioned above, a heterodyne optical imaging system typically operates by mixing a collected signal with a high-frequency reference signal from a local oscillator (LO) to generate a heterodyne signal at a lower beat frequency. Instead of a using a single wavelength LO to perform heterodyne imaging (or multiple LOs having several different wavelengths), our system uses a single "optical comb source" that provides a very large number of wavelengths (>1000) with a channel spacing comparable to the electronic bandwidth of detectors. In this way, heterodyne detection across the entire optical spectrum can be achieved by using a large number of parallel detectors having typical detector bandwidths in the GHz range. Note that each optical frequency comb source is locked to a local atomic clock, which is colocated with the comb source, so that each platform has an absolute and stable optical frequency reference.

This optical frequency comb source additionally uses a self-referenced optical frequency comb stabilization technique, which is based on carrier-envelope locking, to ensure that the spacing between comb lines does not drift significantly over time. More specifically, each optical frequency comb source uses a frequency multiplier to rate-multiply a comb line generated by the comb source, and then locks the rate-multiplied comb line (using a feedback-control technique) to a corresponding higher frequency comb line generated by the comb source.

The above-described optical frequency comb source achieves a stability level exceeding (or comparable to) atomic clocks. Because of this stability, the optical frequency comb sources, located at each of the multiple platforms, provide local oscillators that can be used to synthesize very high resolution images. This is possible because the local atomic clocks can be considered to be coherent with each other, acting like a single local oscillator even though they are located on different platforms.

Existing optical sensors depend upon traditional optical elements that bend optical rays by reflection, refraction, or diffraction to transport the optical fields from the source in object space to an appropriate "plane," typically either an image plane or a pupil plane. We have developed silicon chip-based photonic integrated circuits (PICs) to replace these traditional optical elements. The advantage of using PICs over traditional optical components is the potential for a substantial (orders of magnitude) reduction in size, weight, and power consumption. (Note that the power consumption is associated with the thermal heating that is required to maintain optics at required alignment, surface figure, and index of refraction stabilities.)

Technical Details

Figure 1:
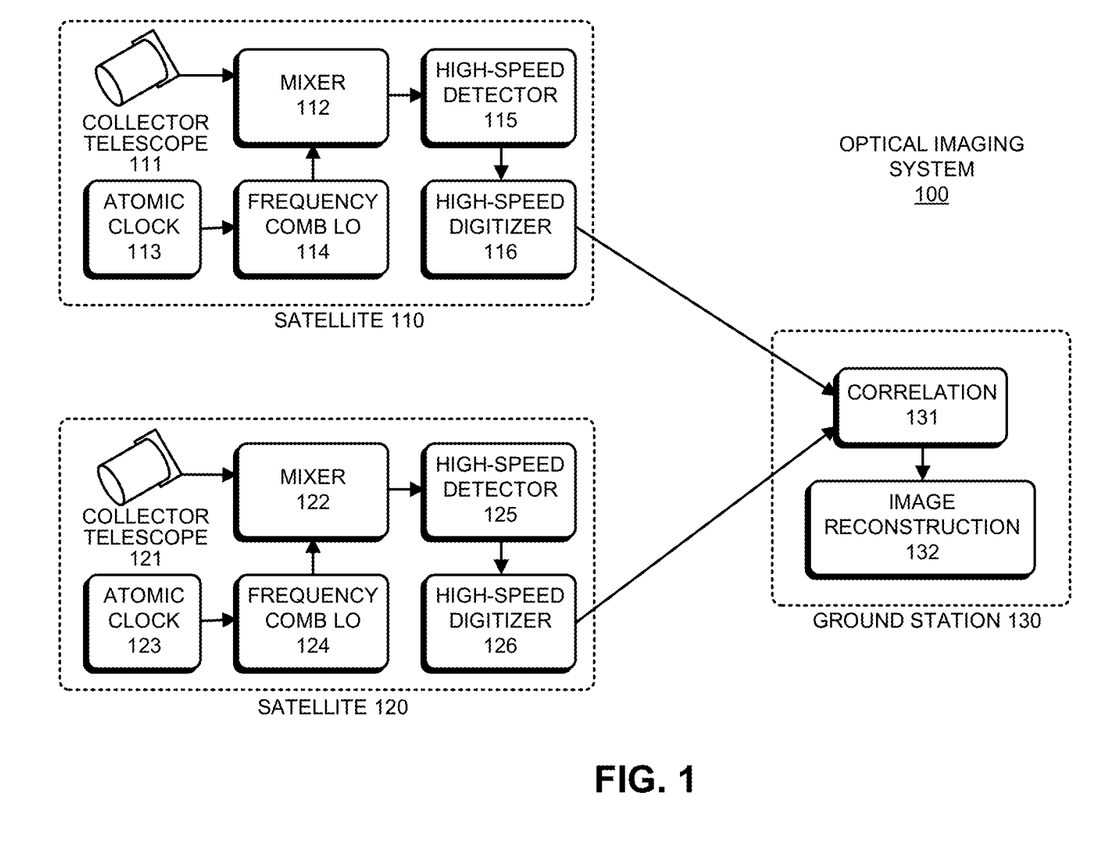
FIG. 1 illustrates a system that performs heterodyne optical imaging across multiple platforms in accordance with the disclosed embodiments.

FIG. 1 illustrates an optical imaging system 100 that performs heterodyne optical imaging across multiple platforms in accordance with the disclosed embodiments. As illustrated in FIG. 1, optical imaging system 100 includes a number of satellites, including satellites 110 and 120, and a ground station 130. Although only two satellites 110 and 120 are illustrated in FIG. 1, this optical imaging system can generally include a larger number of satellites.

Satellites 110 and 120 contain low-cost collector telescopes 111 and 121, respectively, which are directed to gather an optical image of the same imaging-target. These gathered optical images can be transformed and combined so that a constellation of satellites, which are equipped with these collector telescopes, can collectively function as a single high-resolution synthetic aperture. Note that the number of telescopes can be selected to provide the requisite sampling in the Fourier u,v plane with appropriate redundancy to satisfy specific signal-to-noise ratio (SNR) requirements. Moreover, the lens diameters for the collector telescopes can be selected to minimize the fringe visibility reductions due to the integration over external path length caused by changes in the line of sight across the lens field of view at the longest interferometer baselines. During operation, each telescope lens forms an identical image on the surface of a PIC, which contains a two-dimensional waveguide array that collects the light.

As illustrated in FIG. 1, satellite 110 includes an optical frequency comb local oscillator (LO) 114, which generates a large number of optical frequency comb lines with separations in the 10-1000 GHz range, and which is locked to a local atomic clock 113. Signals gathered from collector telescope 111 in satellite 110 feed into a mixer 112, which mixes the gathered signals with a reference comb signal generated by frequency comb LO 114. This mixing process involves using a heterodyne-imaging technique, which mixes the gathered signals with a high-frequency reference signal for each comb line, to generate a heterodyne signal at a lower beat frequency. (Note that large detection bandwidths can be realized by using many parallel heterodyne channels—one for each frequency-comb tooth.) In some embodiments, during the mixing process, the reference comb signal is coupled into waveguides on a PIC. These waveguides route the reference comb signal to various couplers and splitters, where they are mixed with the signals from collector telescope 111, and are coherently added to form the heterodyne signals. This heterodyne signal feeds into a high-speed detector 115, such as a fast photomultiplier tube (PMT). Finally, the output of the high-speed detector feeds into a high-speed digitizer 116 to generate a digitized signal, which is transmitted to a ground station 130.

Satellite 120 is configured similarly to satellite 110. More specifically, satellite 120 includes a frequency comb LO 124, which generates a large number of comb lines in the GHz range, and which is locked to a local atomic clock 123. Signals gathered from collector telescope 121 in satellite 120 feed into a mixer 122, which mixes the gathered signals with the reference comb signal generated by frequency comb LO 124 to generate a heterodyne signal. This heterodyne signal feeds into a high-speed detector 125, and then into a high-speed digitizer 126 to generate a digitized signal, which is transmitted to the ground station 130.

Atomic clocks 113 and 123 will be synchronized with each other by one of them being a master clock and the other acting as a slave clock, which follows the master clock. In the case of multiple platforms with more than two satellites, one of them, which is designated as a master clock (this can be a GPS clock), will synchronize all of the other slave clocks on the other satellites.

Ground station 130 receives the digitized signals from satellites 110 and 120, and uses computing resources to perform various correlation operations 131 and image-reconstruction operations 132 to generate a reconstructed optical image having a spatial resolution exceeding a spatial resolution that can be obtained from a single collector telescope. As mentioned above, this reconstructed image combines the captured spectrum around each of the comb lines to produce a bright and rich color image.

Synthetic Aperture

Figure 2:
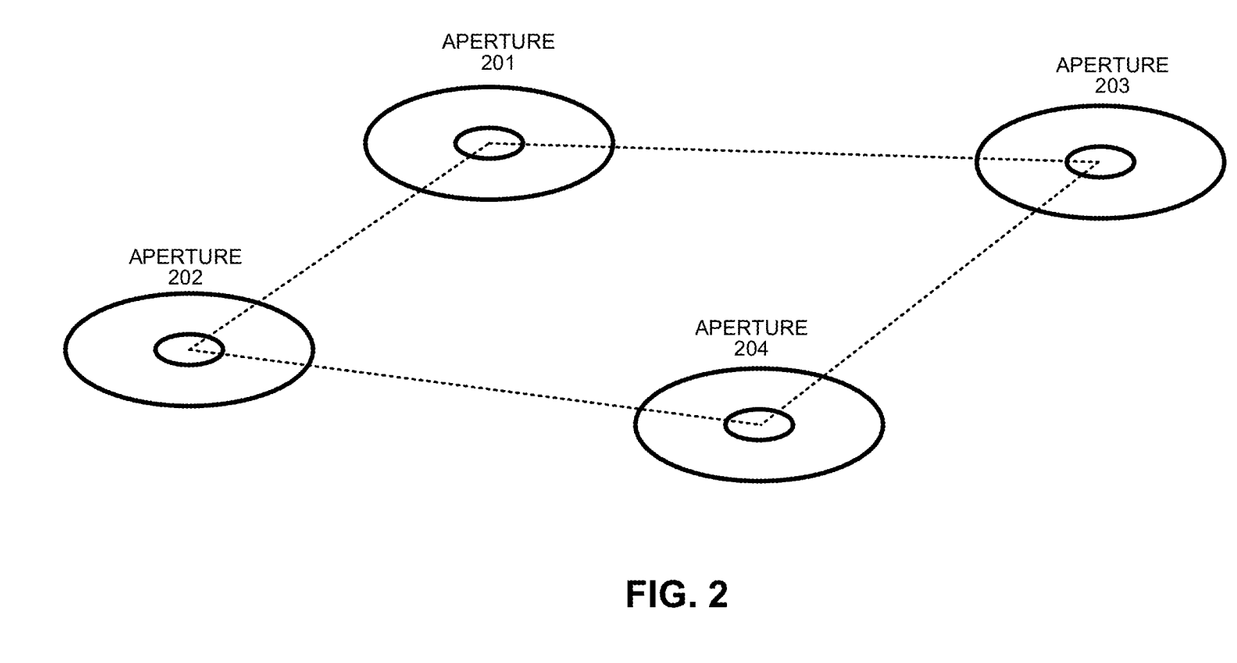
FIG. 2 illustrates multiple satellite-based apertures, which are collectively used to create a synthetic aperture in accordance with the disclosed embodiments.

FIG. 2 illustrates how multiple satellite-based apertures can be used to create a synthetic aperture in accordance with the disclosed embodiments. More specifically, FIG. 2 illustrates four apertures 201-204, which are each implemented using a disk that includes more than 16 blades, wherein each blade is a planar lightwave circuit (PLC) comprising a plurality of left-eye and right-eye waveguide pairs, where each pair of waveguides provides optical signals needed for interferometric imaging. Having multiple pairs of left-eye and right-eye waveguides of differing spacings called "baselines" provides information for reconstructing images composed of many spatial frequencies.

By using more than 16 blades, each aperture receives information from many different angles. In an exemplary embodiment, apertures 201-204 can be separated by 100-200 meters to create a large synthetic aperture. Note that apertures 201-204 can be implemented on different platforms (satellites), but they can alternatively be locked together on a single platform to minimize spacing variations between the apertures.

Optical Frequency Comb Local Oscillator

Figure 3:
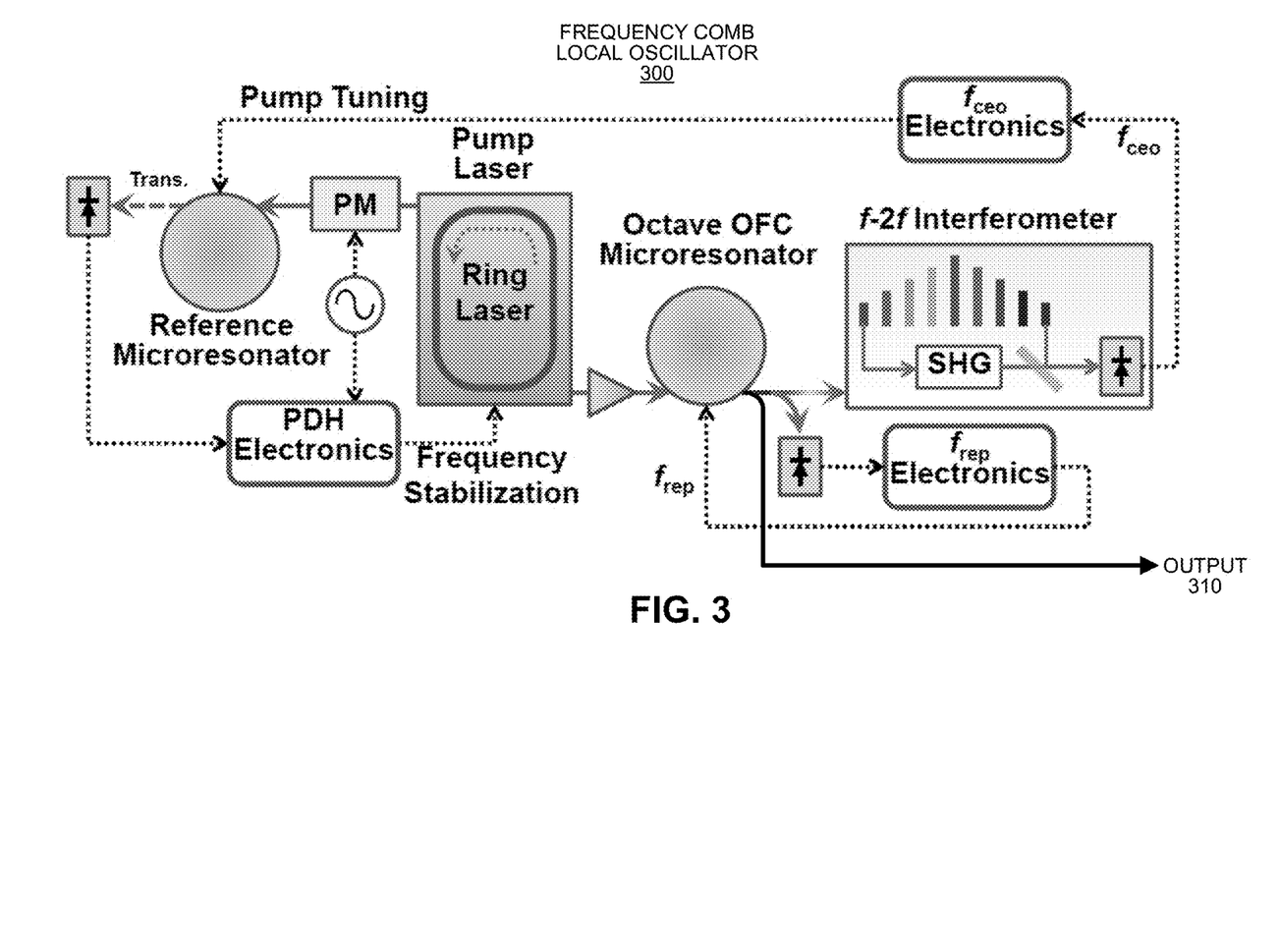
FIG. 3 illustrates an optical frequency comb local oscillator LO in accordance with the disclosed embodiments.

FIG. 3 illustrates an exemplary optical frequency comb local oscillator (LO) 300 in accordance with the disclosed embodiments. This frequency comb LO 300 generates an output 310, which provides a reference comb signal that is used to facilitate a heterodyne imaging process as was described above. Note that frequency comb LO 300 is "self-referenced," which involves using a frequency doubler to double the frequency of a comb line generated by the frequency comb LO. This doubled comb line is then locked to a corresponding higher frequency comb line generated by the frequency comb LO. For example, in FIG. 3, the "red" comb line in the box labeled "f-2f Interferometer" is doubled and compared against the "violet" comb line. (For more details about the operation of this type of frequency comb LO, please refer to Sho Okubo, et al., Novel phase-locking schemes for the carrier envelope offset frequency of an optical frequency comb, *Applied Physics Express* 8, 112402, 2015.). In addition to the self-referenced stabilization, by locking one of the optical frequency comb lines to an atomic line, the optical frequency comb achieves absolute stabilization.

Planar Optical Circuit

Figure 4:
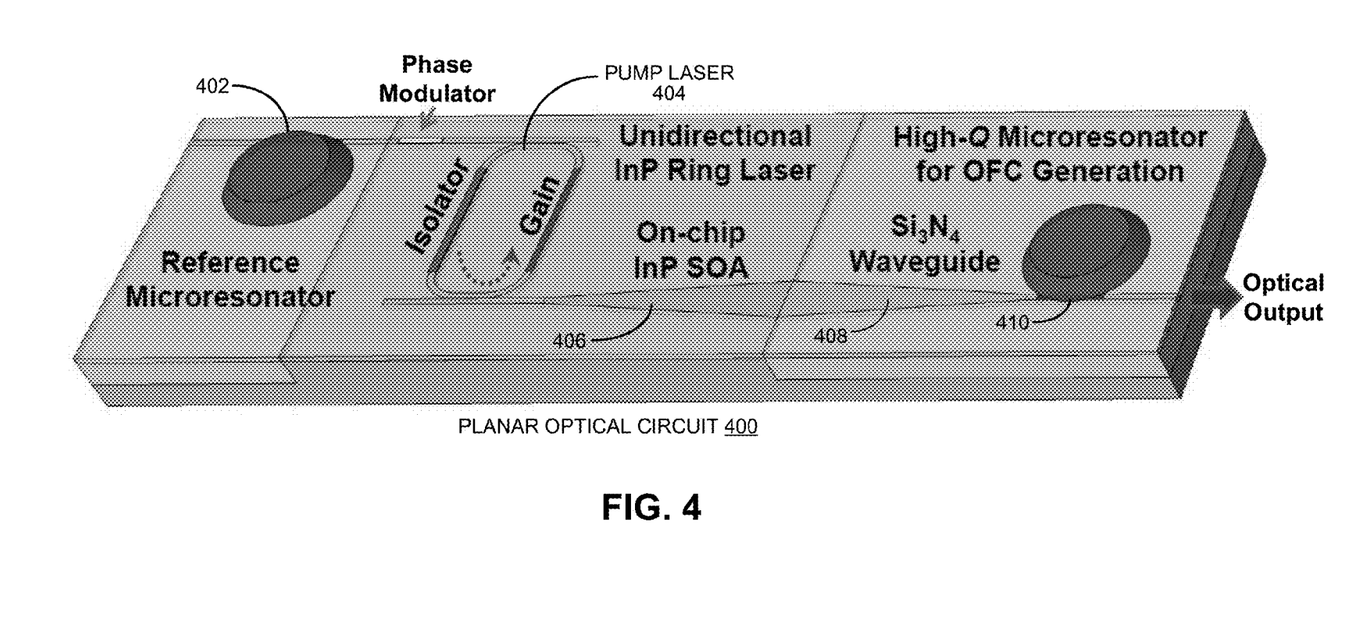
FIG. 4 illustrates how a frequency comb LO can be implemented in a planar optical circuit in accordance with the disclosed embodiments.

FIG. 4 illustrates an example of how an optical frequency comb LO can be implemented in a planar optical circuit in accordance with the disclosed embodiments. More specifically, FIG. 4 illustrates how specific frequency comb LO components, such as a reference microresonator 402, a pump laser 404, an InP silicon optical amplifier (SOA) 406, a waveguide 408, and a high-Q microresonator for OFC generation 410 can be incorporated in a planar optical circuit 400.

Microresonator

Figure 5:
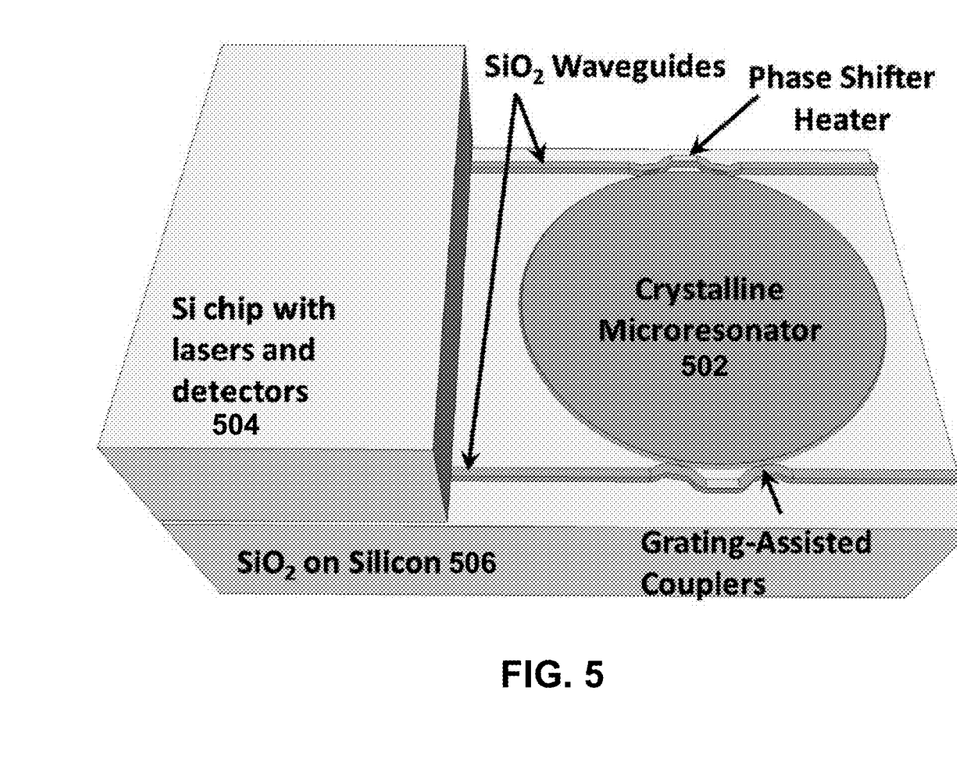
FIG. 5 illustrates how a microresonator can be fabricated on a connected set of silicon chips in accordance with the disclosed embodiments.

FIG. 5 illustrates how a crystalline microresonator 502 (such as microresonator 402 and microresonator 410 in FIG. 4) can be fabricated in a system comprising multiple silicon chips 504 and 506 in accordance with the disclosed embodiments.

Imaging Process

Figure 6:
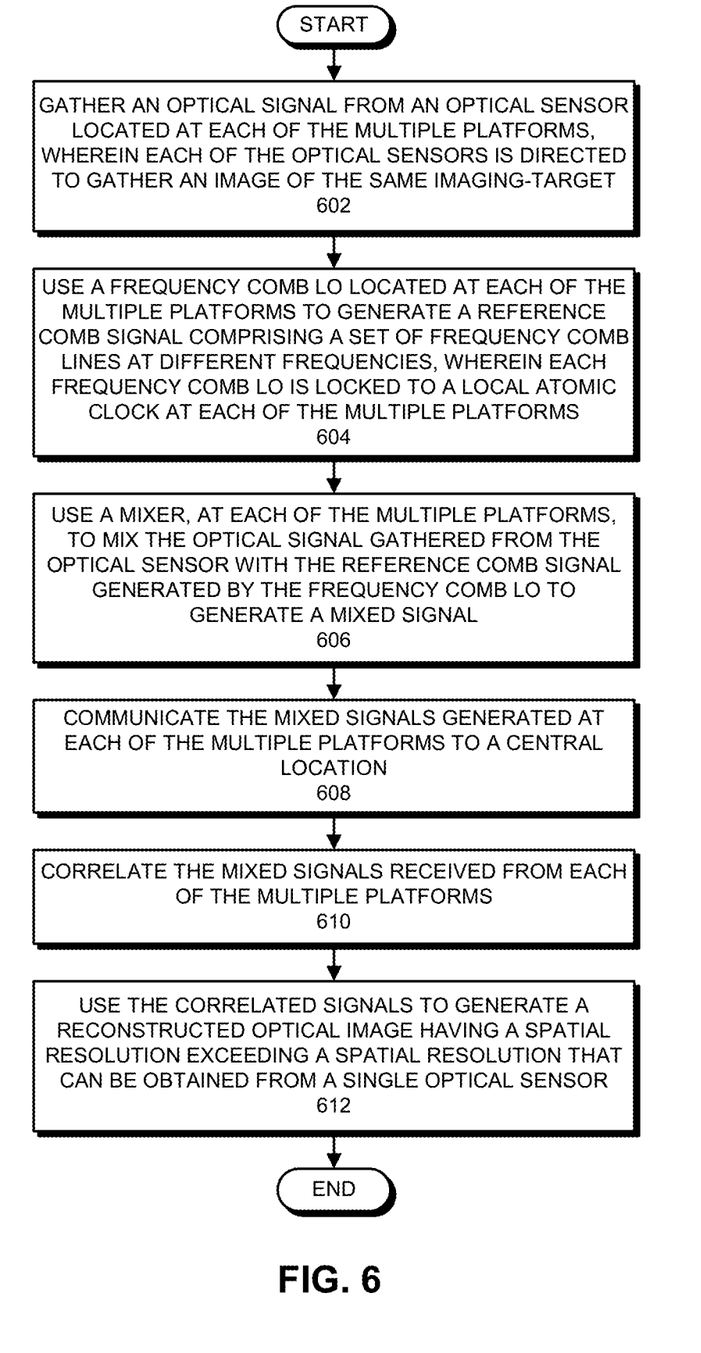
FIG. 6 presents a flow chart illustrating the process of performing heterodyne optical imaging across multiple platforms in accordance with the disclosed embodiments.

FIG. 6 presents a flow chart illustrating the process of performing heterodyne optical imaging across multiple platforms in accordance with the disclosed embodiments. During operation, the system gathers an optical signal from an optical sensor located at each of the multiple platforms, wherein each of the optical sensors is directed to gather an image of the same imaging-target (step 602). The system also uses a frequency comb local oscillator (LO) located at each of the multiple platforms to generate a reference comb signal comprising a set of frequency comb lines at different frequencies, wherein each frequency comb LO is locked to a local atomic clock at each of the multiple platforms (step 604). Next, the system uses a mixer, at each of the multiple platforms, to mix the optical signal gathered from the optical sensor with the reference comb signal generated by the frequency comb LO to generate a mixed signal (step 606). The system then communicates the mixed signals generated at each of the multiple platforms to a central location (step 608). Next, the system correlates the mixed signals received from each of the multiple platforms at the central location (step 610). Finally, the system uses the correlated signals to generate a reconstructed optical image having a spatial resolution exceeding a spatial resolution that can be obtained from a single optical sensor (step 612).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing heterodyne optical imaging across multiple platforms, comprising:
    gathering an optical signal from an optical sensor located at each of the multiple platforms, wherein each of the optical sensors is directed to gather an image of the same imaging-target;
    using an optical frequency comb local oscillator (LO) located at each of the multiple platforms to generate a reference comb signal comprising a set of optical frequency comb lines at different frequencies, wherein each optical frequency comb LO is locked to a local atomic clock at each of the multiple platforms;
    using a mixer, at each of the multiple platforms, to mix the optical signal gathered from the optical sensor with the reference comb signal generated by the optical frequency comb LO to generate a mixed signal;
    communicating the mixed signals generated at each of the multiple platforms to a central location; and
    at the central location,
        correlating the mixed signals received from each of the multiple platforms, and
        using correlated signals to generate a reconstructed optical image having a spatial resolution exceeding a spatial resolution that can be obtained from a single optical sensor.

2. The method of claim 1, wherein the optical frequency comb LOs located at each of the multiple platforms are synchronized with each other, so that the optical frequency comb LOs are effectively synchronous.

3. The method of claim 1, wherein during operation, each optical frequency comb LO is self-referenced by using a frequency multiplier to rate-multiply a comb line generated by the optical frequency comb LO, and then locking the rate-multiplied comb line to a corresponding higher optical frequency comb line generated by the optical frequency comb LO.

4. The method of claim 1, wherein the mixed signal generated at each of the multiple platforms captures a spectrum around each of the optical frequency comb lines in the reference comb signal.

5. The method of claim 1, wherein a number of components at each of the multiple platforms, including the optical frequency comb LO and the mixer, are implemented using planar optical circuits.

6. The method of claim 1, wherein a polarization sensitive reconstruction of an optical image is achieved by utilizing optical frequency comb LOs with a single polarization.

7. The method of claim 1, wherein each of the optical sensors comprises a collector telescope.

8. The method of claim 1, wherein each of the multiple platforms comprises a satellite.

9. The method of claim 8, wherein the central location comprises a ground station that communicates with the multiple platforms.

10. The method of claim 1, wherein communicating the mixed signals to the central location involves digitizing the mixed signals prior to the communication.

11. A system that performs heterodyne optical imaging, comprising:
    multiple platforms, wherein each platform includes an optical sensor that generates an optical signal, wherein each of the optical sensors is directed to gather an image of the same imaging-target;
    an optical frequency comb local oscillator (LO) located at each of the multiple platforms that generates a reference comb signal comprising a set of optical frequency comb lines at different frequencies, wherein each optical frequency comb LO is locked to a local atomic clock located at each of the multiple platforms;
    a mixer located at each of the multiple platforms that mixes the optical signal gathered from the optical sensor with the reference comb signal generated by the optical frequency comb LO to generate a mixed signal;
    a communication mechanism that communicates the mixed signals generated at each of the multiple platforms to a central location; and
    a central processor at the central location, which correlates the mixed signals received from each of the multiple platforms, and generates a reconstructed optical image having a spatial resolution exceeding a spatial resolution that can be obtained from a single optical sensor.

12. The system of claim 11, wherein the optical frequency comb LOs located at each of the multiple platforms are synchronized with each other, so that the optical frequency comb LOs are effectively synchronous.

13. The system of claim 11, wherein each optical frequency comb LO is self-referenced and includes:
   a frequency multiplier that rate-multiplies a comb line generated by the optical frequency comb LO; and
   a locking mechanism that locks the rate-multiplied comb line to a corresponding higher optical frequency comb line generated by the optical frequency comb LO.

14. The system of claim 11, wherein the mixed signal generated at each of the multiple platforms captures a spectrum around each of the optical frequency comb lines in the reference comb signal.

15. The system of claim 11, wherein a number of components at each of the multiple platforms, including the optical frequency comb LO and the mixer, are implemented using planar optical circuits.

16. The system of claim 11, wherein each of the optical sensors comprises a collector telescope.

17. The system of claim 11, wherein each of the multiple platforms comprises a satellite.

18. The system of claim 17, wherein the central location comprises a ground station that communicates with the multiple platforms.

19. The system of claim 11, wherein the mixed signals are digitized prior to being sent to the centralized location.

20. A platform that facilitates performing heterodyne optical imaging across multiple platforms, comprising:
   an optical sensor that generates an optical signal, wherein the optical sensor is directed to gather an image of an imaging-target;
   a local atomic clock;
   an optical frequency comb local oscillator (LO) that generates a reference comb signal comprising a set of optical frequency comb lines at different frequencies, wherein the optical frequency comb LO is locked to the local atomic clock;
   a mixer that mixes the optical signal gathered from the optical sensor with the reference comb signal generated by the optical frequency comb LO to generate a mixed signal; and
   a communication mechanism that communicates the mixed signal to a central location to enable a central processor at the central location to correlate the mixed signals received from the multiple platforms, and to generate a reconstructed optical image having a spatial resolution exceeding a spatial resolution that can be obtained from a single optical sensor.

21. The platform of claim 20, wherein the optical frequency comb LO is self-referenced and includes:
   a frequency multiplier that rate-multiplies a comb line generated by the optical frequency comb LO; and
   a locking mechanism that locks the rate-multiplied comb line to a corresponding higher optical frequency comb line generated by the optical frequency comb LO.

22. The platform of claim 20, wherein the mixed signal captures a spectrum around each of the optical frequency comb lines in the reference comb signal.

23. The platform of claim 20, wherein a number of components at each of the multiple platforms, including the optical frequency comb LO and the mixer, are implemented using planar optical circuits.

24. The platform of claim 20, wherein the optical sensor comprises a collector telescope.

25. The platform of claim 20, wherein the platform comprises a satellite.

* * * * *